(12) United States Patent
Vargas (10) Patent No.: US 11,668,138 B2
(45) Date of Patent: Jun. 6, 2023

(54) CONNECTOR FOR A DRILLING OR PRODUCTION SYSTEM

(71) Applicant: Cameron International Corporation, Houston, TX (US)

(72) Inventor: Florent Vargas, Beziers (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 123 days.

(21) Appl. No.: 17/120,445

(22) Filed: Dec. 14, 2020

(65) Prior Publication Data

US 2021/0180413 A1    Jun. 17, 2021

(30) Foreign Application Priority Data

Dec. 13, 2019   (EP) ..................................... 19306649

(51) Int. Cl.
  *E21B 17/046*   (2006.01)
  *E21B 17/08*   (2006.01)
  *E21B 33/038*   (2006.01)

(52) U.S. Cl.
  CPC ........ *E21B 17/0465* (2020.05); *E21B 17/085* (2013.01); *E21B 33/038* (2013.01)

(58) Field of Classification Search
  CPC .. E21B 17/0465; E21B 17/085; E21B 33/038; E21B 43/013; F16L 37/002
  See application file for complete search history.

(56) References Cited

U.S. PATENT DOCUMENTS

| | | | |
|---|---|---|---|
| 2,463,179 A | 3/1949 | Iftiger, Sr. | |
| 5,309,991 A * | 5/1994 | Watkins | E21B 33/038 285/309 |
| 10,858,901 B1 * | 12/2020 | Rahim | F16L 37/10 |
| 2020/0141196 A1 * | 5/2020 | Young | E21B 19/10 |

FOREIGN PATENT DOCUMENTS

| | | | |
|---|---|---|---|
| WO | 2015030775 A1 | 3/2015 | |
| WO | 2019125176 A1 | 6/2019 | |
| WO | WO-2019125176 A1 * | 6/2019 | ........... E21B 17/046 |

* cited by examiner

*Primary Examiner* — D. Andrews
*Assistant Examiner* — Yanick A Akaragwe
(74) *Attorney, Agent, or Firm* — Kelly McKinney (57) ABSTRACT

A connector is configured to couple a first annular member to a second annular member. The connector includes a rotatable plate and multiple lock segments. The connector further includes a coupling assembly that is configured to couple the rotatable plate to the multiple lock segments, such that rotation of the rotatable plate in a circumferential direction drives the plurality of lock segments along a radial axis to adjust the connector between an unlocked configuration and a locked configuration.

16 Claims, 10 Drawing Sheets

CONNECTOR FOR A DRILLING OR PRODUCTION SYSTEM

BACKGROUND

This application claims priority to and the benefit of European Patent Application No. 19306649.5, titled "Connector for a Drilling or Production System," filed Dec. 13, 2019, the entire disclosure of which is hereby incorporated herein by reference.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a natural resource is discovered below the surface of the earth, a drilling system may be employed to access the natural resource, and a production system may be employed to extract the natural resource. An offshore drilling and/or production system may include a wellhead at a sea floor, a blowout preventer (BOP) stack positioned above the wellhead, and a riser that between the BOP stack to a platform (e.g., drilling rig or surface vessel) at a sea surface. One or more connectors may couple the riser to the BOP stack and the BOP stack to the wellhead, for example.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed to a connector (e.g., a connector assembly, a connector system) that is configured to couple two annular members (e.g., tubular members) of a drilling and/or production system to one another. For example, one connector may be utilized to couple a riser (e.g., a drilling riser and/or a production riser) to a blowout preventer (BOP) stack, and/or one connector may be utilized to couple the BOP stack to a wellhead. In certain embodiments, the connector includes a drive system (e.g., hydraulic drive system, pneumatic drive system, electric drive system) that is configured to drive a plate (e.g., annular plate; rotatable plate) to rotate in a circumferential direction, which in turn drives lock segments to move in a radial direction between an unlocked configuration and a locked configuration. The connector may facilitate efficient coupling of the two annular members, and/or the connector may have a reduced height along an axial axis as compared to some other connectors, for example.

While certain embodiments disclosed herein relate to an offshore drilling and/or production system (e.g., subsea system), it should be understood that the connector may be adapted for use within an on-shore drilling and/or production system (e.g., land-based system). Furthermore, while certain embodiments described herein relate to using the connector to couple a BOP stack and a wellhead to one another, it should be understood that the connector may be adapted to couple a riser to the BOP stack and/or to couple any of a variety of annular members to one another.

Figure 1:
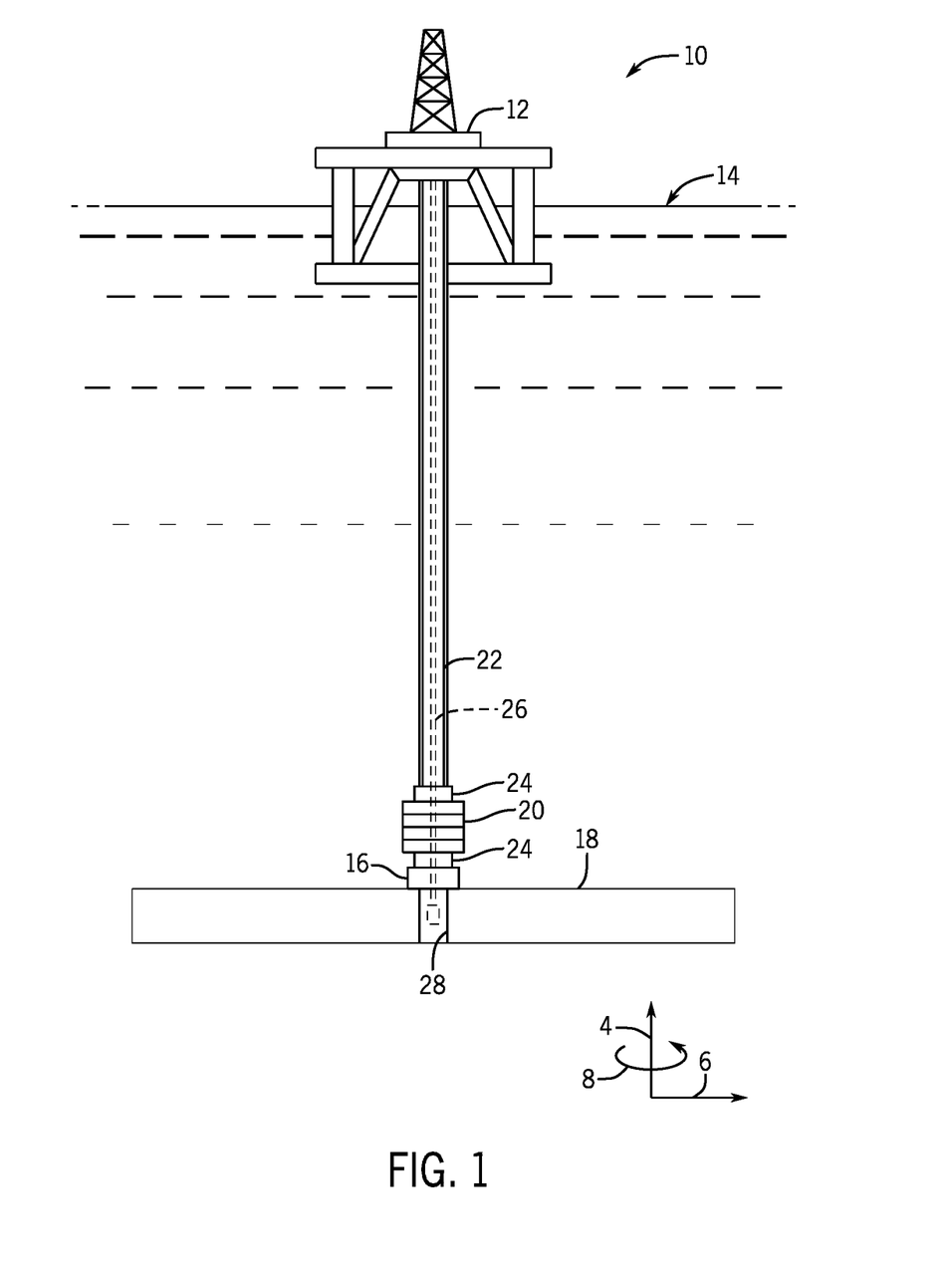
FIG. 1 is a schematic diagram of an offshore system, in accordance with an embodiment of the present disclosure.

FIG. 1 is an embodiment of an offshore system 10 (e.g., offshore drilling and/or production system; offshore mineral extraction system; subsea system). To facilitate discussion, the offshore system 10 and its components may be described with reference to an axial axis or direction 4, a radial axis or direction 6, and a circumferential axis or direction 8. The offshore system 10 includes a vessel or platform 12 at a sea surface 14 and a wellhead 16 positioned at a sea floor 18. The offshore system 10 also includes a BOP stack 20 positioned above the wellhead 16, a riser 22 that extends between the BOP stack 20 and the vessel or platform 12, and one or more connectors 24 (e.g., connector assemblies; connector systems) that are configured to couple (e.g., physically and fluidly couple) various annular members of the offshore system 10 to one another. For example, one connector 24 may couple the wellhead 16 to the BOP stack 20, and one connector may couple the BOP stack 20 to the riser 22. Downhole operations may be carried out by a tubular string 26 (e.g., drill string or production tubing string) that extends from the vessel or platform 12, through the riser 22, through the BOP stack 20, through the wellhead 16, and into a wellbore 28.

Figure 2:
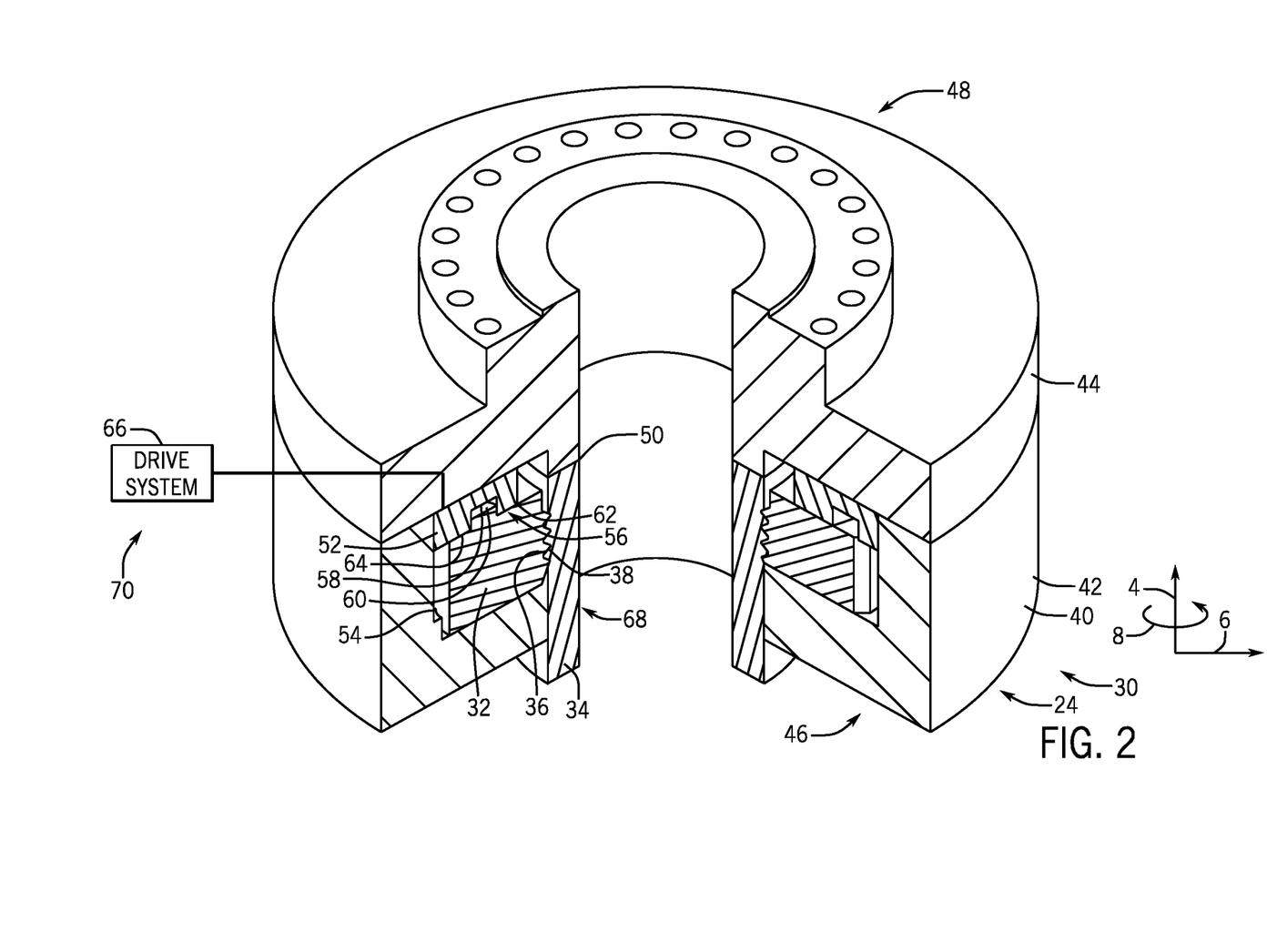
FIG. 2 is a cut-away perspective view of an embodiment of a connector that may be used within the offshore system of FIG. 1, wherein the connector is in a locked configuration.

FIG. 2 is a cut-away perspective view of an embodiment of a portion of the connector 24 in a locked configuration 30 (e.g., locked position). In the locked configuration 30, multiple lock segments 32 of the connector 24 are in a collapsed position (e.g., radially-collapsed position) that enables the lock segments 32 to contact and engage a first annular member 34 (e.g., tubular member, the wellhead 16 of FIG. 1, the BOP stack 20 of FIG. 1). In particular, in the locked configuration 30, respective radially-inner surfaces 36 of the lock segments 32 contact and engage a radially-outer surface 38 (e.g., annular surface) of the first annular member 34, thereby locking the connector 24 to the first annular member 34 and blocking movement of the connector 24 relative to the first annular member 34.

In the illustrated embodiment, the connector 24 includes a body 40 (e.g., connector body, annular body). In some embodiments, the body 40 may include multiple body portions, such as a first body portion 42 and a second body portion 44 that couple to one another via one or more fasteners (e.g., threaded fasteners, such as bolts) to form the body 40. The body 40 may extend along the axial axis 4 from a first end portion 46 to a second end portion 48. The first end portion 46 may be configured to circumferentially surround a portion of the first annular member 34. The second end portion 48 may be configured to couple to a second annular member (e.g., tubular member, the BOP stack 20 of FIG. 1, the riser 22 of FIG. 1) via one or more fasteners (e.g., threaded fasteners, such as bolts). In this way, relative movement between the connector 24 and the second annular member is blocked. Thus, while the connector 24 is in the locked configuration 30 about the first annular member 34 and while the connector 24 is coupled to the second annular member, relative movement between the first annular member 34 and the second annular member is blocked and the first annular member 34 and the second annular member are coupled to one another by the connector 24. The body 40 may include a sealing portion 50 (e.g., sealing end portion or surface) that is configured to contact and/or seal against the first annular member 34. It should be appreciated that the first end portion 46 and the second end portion 48 may have any suitable form to facilitate connection to any of a variety of annular members.

As shown, the connector 24 includes a plate 52 (e.g., annular plate; rotatable plate, cam plate), and the plate 52 and the lock segments 32 are positioned within a recess 54 (e.g., annular recess) of the body 40 (e.g., defined by the body 40). Furthermore, the plate 52 is configured to rotate in the circumferential direction 8, and an interface 56 (e.g., cam interface) between the plate 52 and the lock segments 32 enables the rotation of the plate 52 to drive the lock segments 32 to move along the radial axis 6. In particular and as described in more detail below, the interface 56 may include multiple grooves 58 (e.g., circumferentially-extending grooves; curved grooves; cam grooves) and multiple protrusions 60 (e.g., axially-extending protrusions; cam followers) that engage and/or follow the multiple grooves 58 as the plate 52 rotates in the circumferential direction 8. For example, a surface 62 (e.g., axially-facing surface; lower surface; lock segment-contacting surface) of the plate 52 may include the multiple grooves 58 spaced about the circumferential axis 8, and each lock segment 32 may include at least one of the multiple protrusions 60 extending from a surface 64 (e.g., axially-facing surface; upper surface; plate-contacting surface) of the lock segment 32. In operation, the multiple protrusions 60 may be guided by and/or follow the multiple grooves 58 as the plate 52 rotates in the circumferential direction 8, thereby driving the lock segments 32 along the radial axis 6 between the locked configuration 30 and an unlocked configuration.

It should be appreciated that the plate 52 may be driven to rotate via any suitable drive system 66. For example, the plate 52 may be driven to rotate via a hydraulic drive system, a pneumatic drive system, or an electric drive system having components positioned within the body 40 and/or outside of the body 40. For example, the plate 52 may be driven to rotate by an electric motor positioned outside of the body 40, and an output shaft of the electric motor may extend through the body 40 to interface with a conversion assembly (e.g., gears) that converts (e.g., changes; transforms) the rotation of the output shaft to rotate the plate 52. Together, the components within the recess 54 (e.g., the plate 52, the lock segments 32) may form a coupling assembly 68 (e.g., cam lock assembly), and the coupling assembly 68 together with the drive system 66 and other associated components may form a lock system 70 (e.g., cam lock system).

Figure 3:
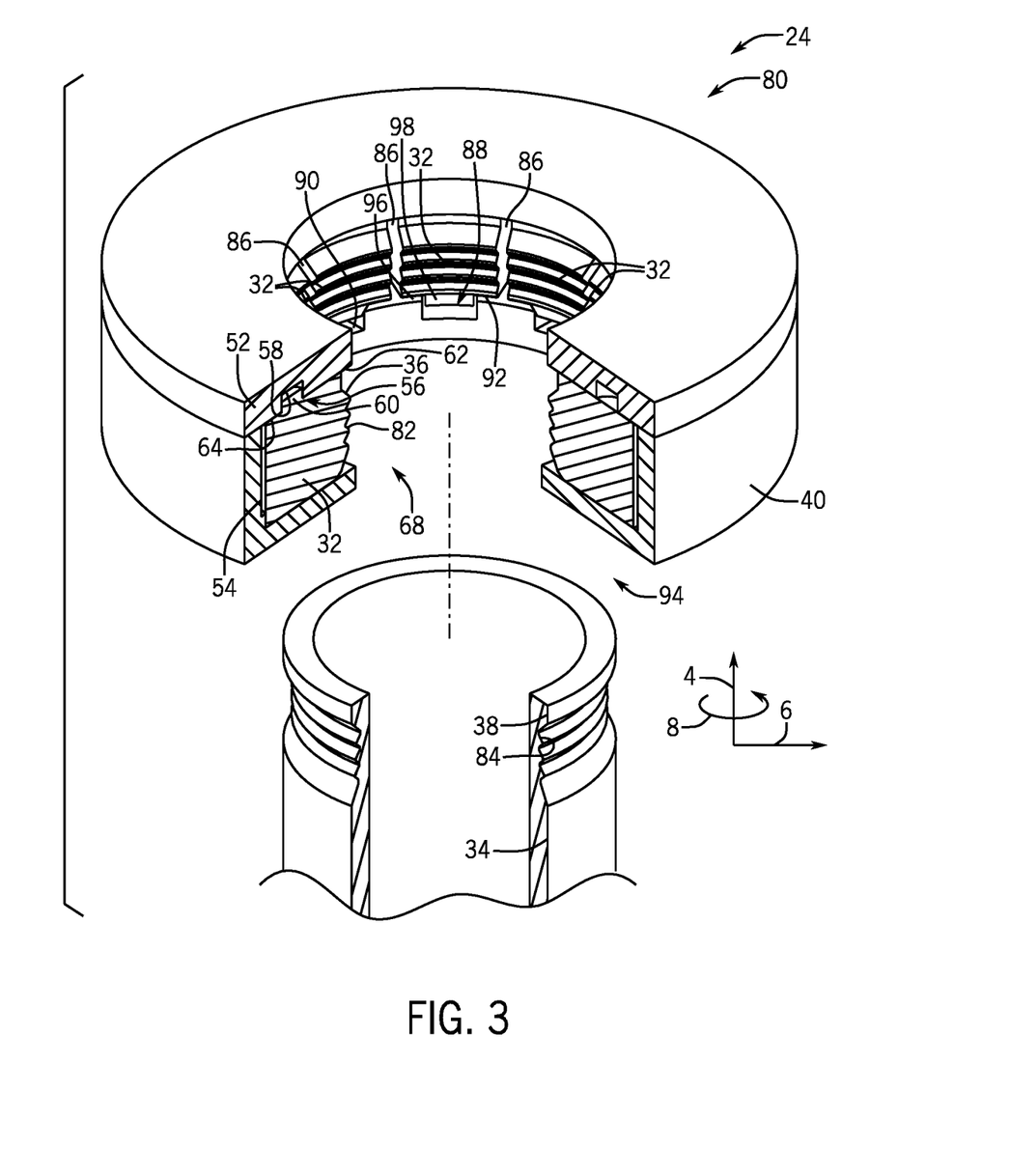
FIG. 3 is a cut-away perspective view of a portion of the connector of FIG. 2, wherein the connector is in an unlocked configuration.
Figure 4:
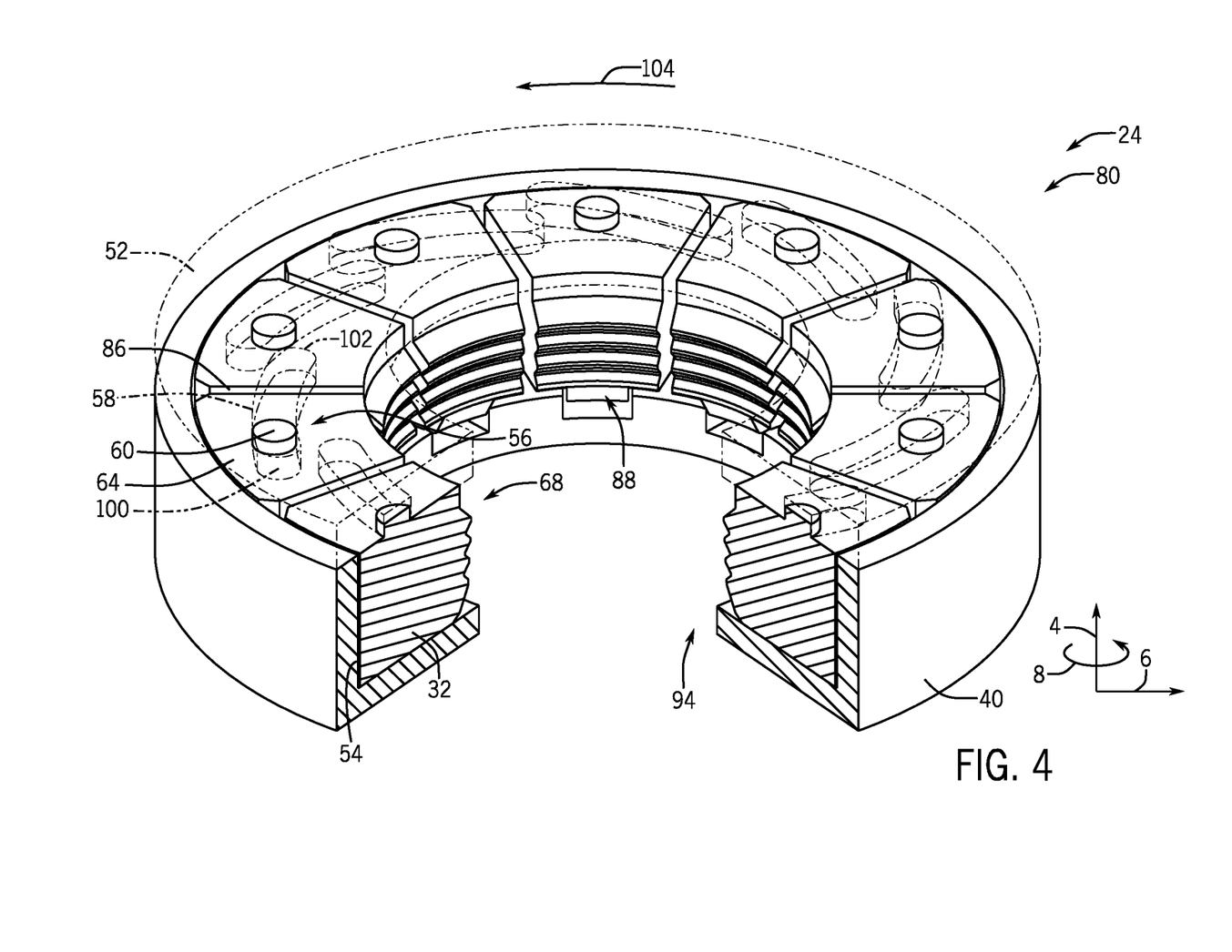
FIG. 4 is a cut-away perspective view of the portion of the connector of FIG. 3, wherein the connector is in the unlocked configuration and a coupling assembly is visible through a plate.
Figure 5:
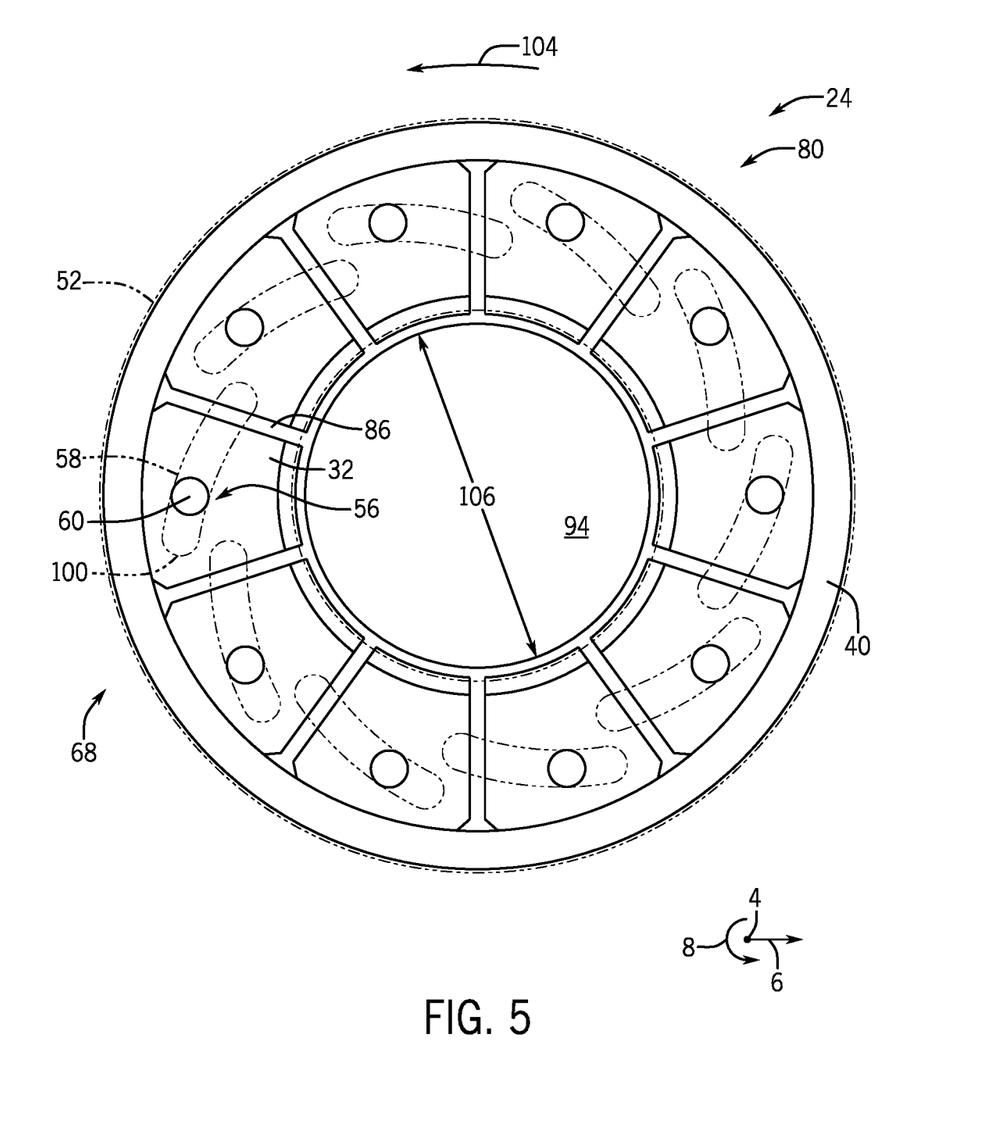
FIG. 5 is a top cross-sectional view of the portion of the connector of FIG. 3, wherein the connector is in the unlocked configuration.
Figure 6:
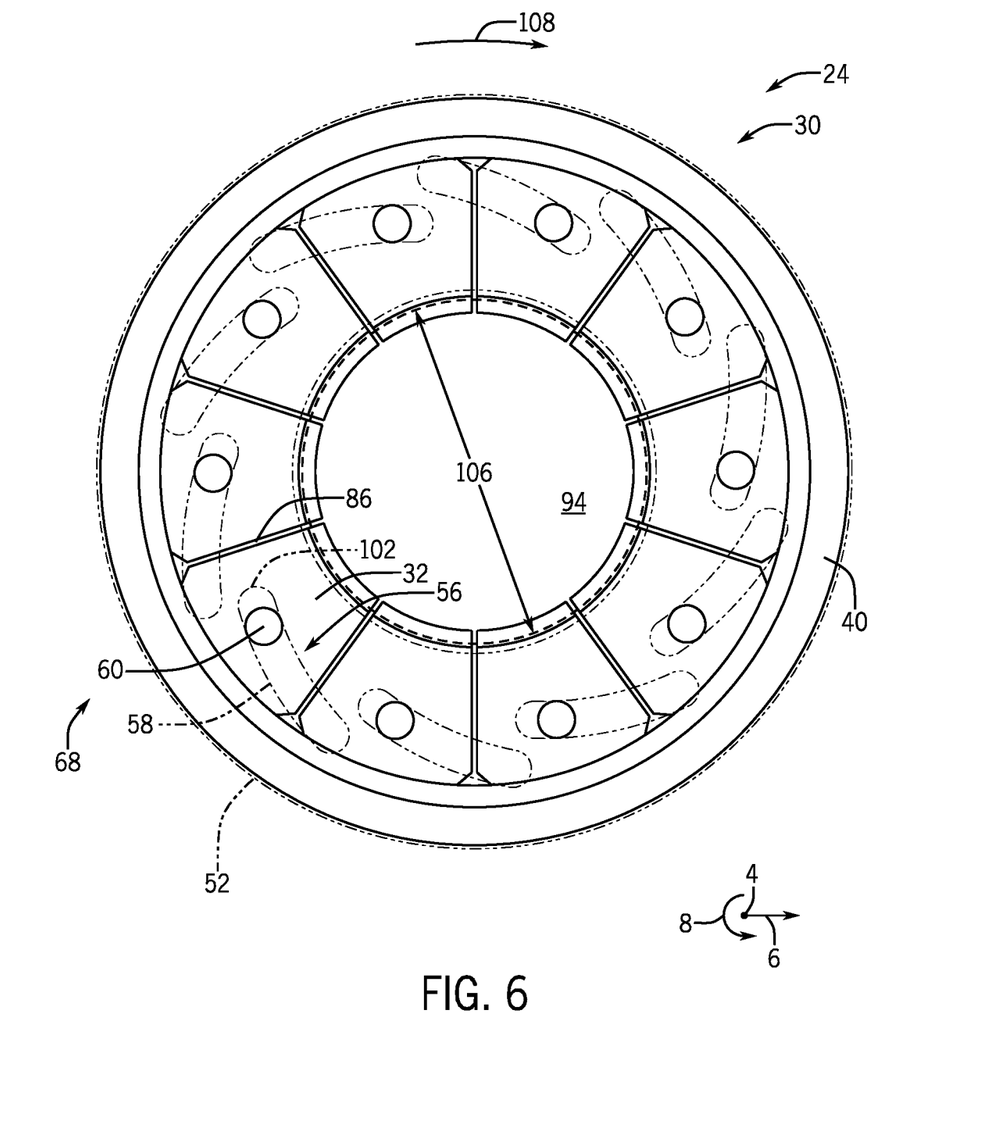
FIG. 6 is a top cross-sectional view of the portion of the connector of FIG. 3, wherein the connector is in the locked configuration.

FIGS. 3-6 provide additional views of a portion of the connector 24. In particular, FIG. 3 illustrates a cut-away perspective view of a portion of the connector 24 in an unlocked configuration 80 (e.g., unlocked position). FIG. 4 illustrates the portion of the connector 24 in the unlocked configuration 80, and with various features visible through the plate 52 to facilitate discussion. FIG. 5 illustrates a top view of the portion of the connector 24 in the unlocked configuration 80, and with various features visible through the plate 52 to facilitate discussion. FIG. 6 illustrates a top view of the portion of the connector 24 in the locked configuration 30, and with various features visible through the plate 52 to facilitate discussion.

With reference to FIG. 3, the connector 24 includes the coupling assembly 68 having the plate 52 and the lock segments 32 positioned within the recess 54 formed in the body 40. Multiple lock segments 32 are labeled to illustrate that the multiple lock segments 32 may be positioned at discrete locations about the circumference of the connector 24. Furthermore, it should be appreciated that the connector 24 may include any suitable number of lock segments 32. As shown, the respective radially-inner surface 36 of each lock segment 32 may include engagement features 82 (e.g., radially-inwardly protruding elements; annular features) that are configured to contact and engage corresponding engagement features 84 (e.g., radially-outwardly protruding elements; annular features) on the radially-outer surface 38 (e.g., annular surface) of the first annular member 34 to lock the connector 24 to the first annular member 34.

In the unlocked configuration 80, the lock segments 32 may be in an expanded position (e.g., radially-expanded position) that enables the first annular member 34 to be received and/or positioned within an opening 94 defined by the lock segments 32 (e.g., circumferentially surrounding by the lock segments 32). Additionally, in the unlocked configuration 80, the lock segments 32 are spaced apart from one another (e.g., adjacent lock segments 32 are separated by a circumferentially-extending gap 86). An interface 88 (e.g., radially-guiding interface; key-slot interface) between each lock segment 32 and the body 40 may block movement of the lock segment 32 in the circumferential direction 8, while enabling movement of the lock segment 32 along the radial axis 6. For example, at least a portion of each lock segment 32 may be supported or held within a respective radially-extending slot 90 formed in a surface 92 (e.g., axially-facing surface; lock segment-contacting surface) of the body 40. In particular, in the illustrated embodiment, each lock segment 32 includes a key 98 (e.g., protrusion) that extends from a surface 96 (e.g., axially-facing surface; body-contacting surface). The key 98 may contact and engage the respective radially-extending slot 90 to thereby block movement of the lock segment 32 in the circumferential direction 8, while enabling movement of the lock segment 32 along the radial axis 6. As discussed in more detail below, the interface 88 may guide the lock segments 32 to move along the radial axis 6 (and block the lock segments 32 from moving in the circumferential direction) as the plate 52 rotates in the circumferential direction 8. It should be appreciated that the slot of the interface 88 may be formed in the lock segment 32 and the key of the interface 88 may extend from the body 40. The interface 88 may work in conjunction with the interface 56, which may be formed by the grooves 58 formed in the surface 62 of the plate 52 and the protrusions 60 extending from the surfaces 64 of the lock segments 32, to drive the lock segments 32 along the radial axis 6 (e.g., only along the radial axis 6; without movement in the circumferential direction 8) upon rotation of the plate 52.

Additional details of the interface 56 are show in FIG. 4. In the illustrated embodiment, the multiple grooves 58 are formed in the plate 52 and are positioned at discrete locations about the circumferential axis 8. Additionally, each of the multiple grooves 58 may receive and/or engage with a respective protrusion 60 extending from the respective surface 64 of a respective lock segment 32. Each of the multiple grooves 58 may have a curvature (e.g., curved cross-sectional shape; a radially-inner edge and a radially-outer edge may be curved). Furthermore, each of the multiple grooves 58 may have a first end portion 100 (e.g., radially-outer portion) that is at a first radial position (e.g., radially-outer position) along the radial axis 6, and a second end portion 102 (e.g., radially-inner portion) that is at a second radial position (e.g., radially-inner position) along the radial axis 6. Upon rotation of the plate 52, the position of each groove 58 changes along the circumferential axis 8, but not along the radial axis 6.

In operation, rotation of the plate 52 in the circumferential direction 8 may cause the protrusions 60 to follow the multiple grooves 58. Because the lock segments 32 are blocked from moving in the circumferential direction 8 by the interface 88, the lock segments 32 move radially along the radial axis 6 as the protrusions 60 follow the multiple grooves 58 to adjust the connector 24 between the locked configuration 30 (FIG. 2) and the unlocked configuration 80. For example, in the illustrated embodiment, rotation of the plate 52 in a direction of arrow 104 would drive the lock segments 32 to move radially-inwardly as the lock segments follow the multiple grooves 58 from the first end portions 100 to the second end portions 102, thereby adjusting the connector 24 from the unlocked configuration 80 to the locked configuration 30 (FIG. 2). Then, while the connector 24 is in locked configuration 30 (FIG. 2), rotation of the plate 52 in a direction opposite of the direction of arrow 104 would drive the lock segments 32 to move radially-outwardly to adjust the connector 24 from the locked configuration 30 to the unlocked configuration 80. The plate 52 and/or the locking segments 32 may be fixed (e.g., may not move) along the axial axis 4 as the connector 24 transitions between the locked configuration 30 and the unlocked configuration 80.

FIG. 5 illustrates an example of the positions of the lock segments 32, the grooves 58, and the protrusions 60 while the connector 24 is in the unlocked configuration 80. For example, the lock segments 32 are separated by the gaps 86, and each protrusion 60 is positioned proximate to (e.g., near and/or contacting) a respective first end portion 100 of a respective groove 58. To move from the unlocked configuration 80 of FIG. 5 to the locked configuration 30 of FIG. 6, the plate 52 may be rotated in the direction of arrow 104.

FIG. 6 illustrates an example of the positions of the lock segments 32, the grooves 58, and the protrusions 60 while the connector 24 is in the locked configuration 30. For example, the lock segments 32 are not separated by the gaps 86 (e.g., the adjacent lock segments 32 contact one another) and/or the gaps 86 between the lock segments 32 are smaller (e.g., as compared to the gaps 86 while the connector 24 is in the unlocked configuration 80). The lock segments 32 are also positioned further radially-inwardly and a diameter 106 the opening 94 is smaller (e.g., as compared to the unlocked configuration 80). Furthermore, each protrusion 60 is positioned proximate to (e.g., near and/or contacting) a respective second end portion 102 of a respective groove 58. To move from the locked configuration 30 of FIG. 6 to the unlocked configuration 80 of FIG. 5, the plate 52 may be rotated in a direction of arrow 108 (e.g., opposite the direction of arrow 104). It should be appreciated that FIGS. 2-6 illustrate one example of the connector 24 wherein rotation of a plate drives multiple lock segments in a radial direction and that other structural features and variations are envisioned.

FIGS. 7-10 illustrate an embodiment of the connector 24 that may be used in the offshore system of FIG. 1 (e.g., to connect the riser 22 to the BOP stack 20 and/or to connect the BOP stack 20 to the wellhead 16), wherein the connector 24 includes a coupling assembly 120 (e.g., a crank assembly, which may be used instead of the cam assembly 68 of FIGS. 2-6). As shown, the coupling assembly 120 may include a plate 122 (e.g., annular plate, rotatable plate), a crank arm assembly 124, and multiple lock segments 126.

Figure 7:
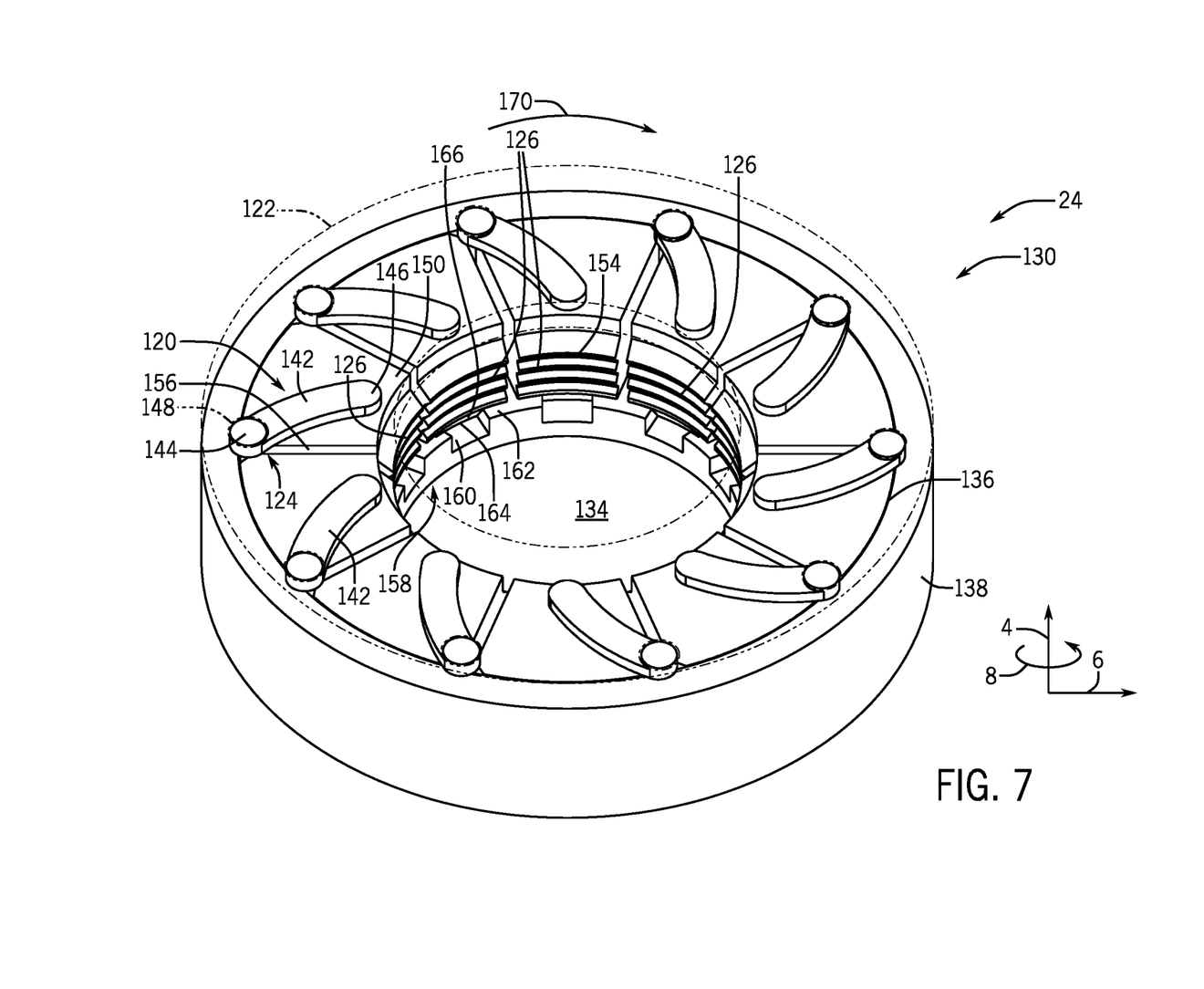
FIG. 7 is a perspective view of an embodiment of a connector that may be used within the offshore system of FIG. 1, wherein the connector includes a crank assembly and is in an unlocked configuration.
Figure 8:
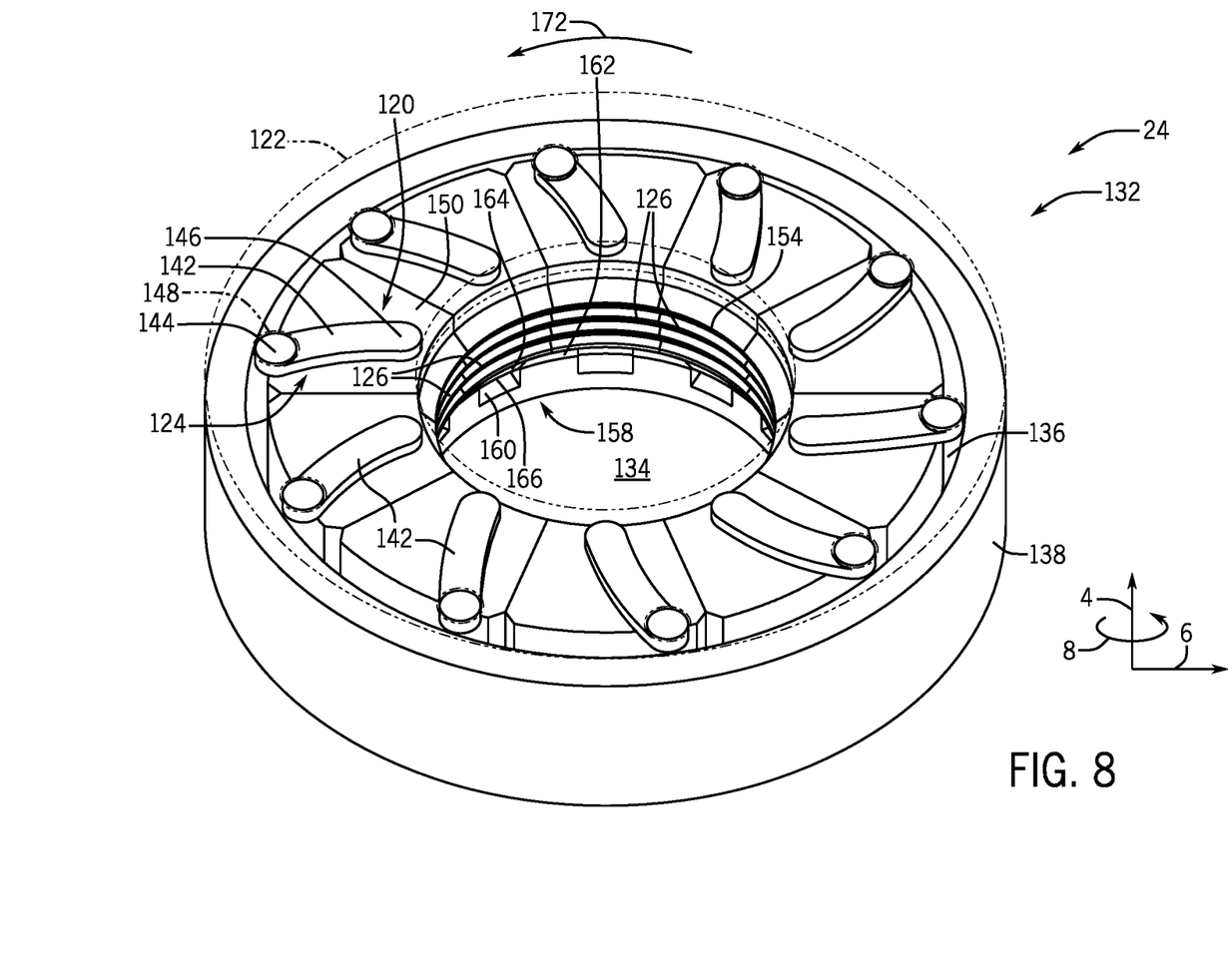
FIG. 8 is a perspective view of the connector of FIG. 7, wherein the connector is in a locked configuration.
Figure 9:
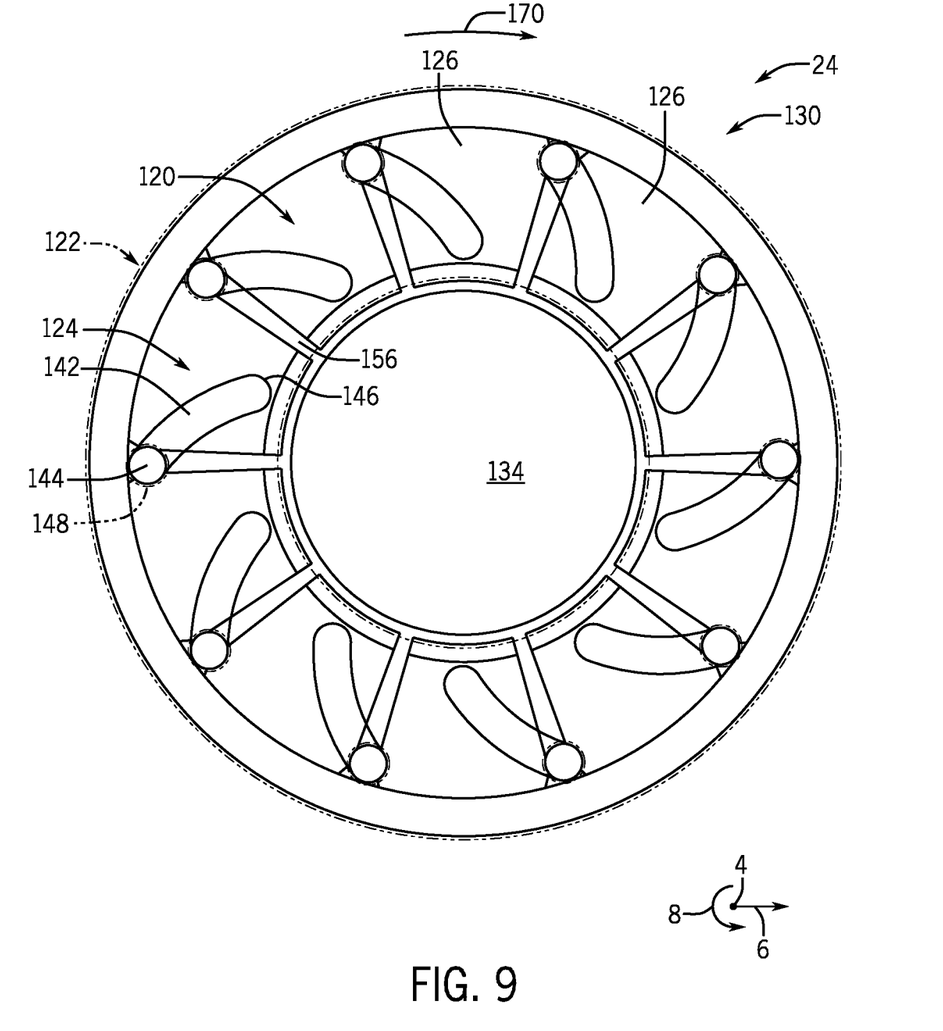
FIG. 9 is a top cross-sectional view of the connector of FIG. 7, wherein the connector is in the unlocked configuration.
Figure 10:
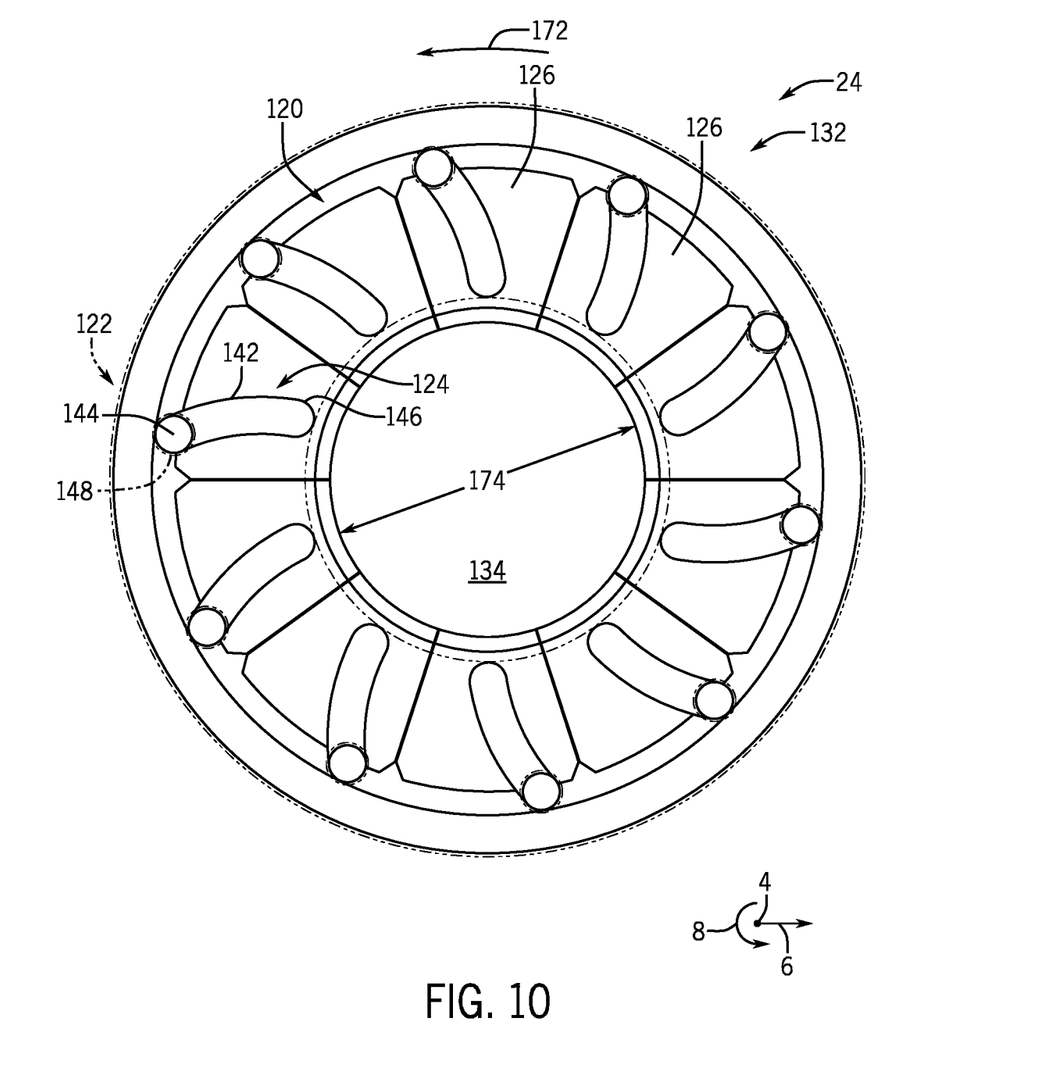
FIG. 10 is a top cross-sectional view of the connector of FIG. 7, wherein the connector is in the locked configuration.

In particular, FIG. 7 is a perspective view of the connector 24 having the coupling assembly 120 while the connector 24 is in an unlocked configuration 130, and FIG. 8 is a perspective view of the connector 24 having the coupling assembly 120 while the connector 24 is in the locked configuration 132. FIG. 9 is a top view of the portion of the connector 24 having the coupling assembly 120 while the connector 24 is in the unlocked configuration 130, and with various features visible through the plate 122 to facilitate discussion. FIG. 10 illustrates a top view of the portion of the connector 24 having the coupling assembly 120 while the connector 24 is in the locked configuration 132, and with various features visible through the plate 122 to facilitate discussion.

In the unlocked configuration 130, the lock segments 126 may be in an expanded position (e.g., radially-expanded position) that enables a first annular member (e.g., tubular member, the wellhead 16 of FIG. 1, the BOP stack 20 of FIG. 1) to be received and/or positioned within an opening 134 defined by the lock segments 126. In the locked configuration 132, the lock segments 126 may be in a collapsed position (e.g., radially-collapsed position) that enables the lock segments 126 to contact and engage the first annular member. In particular, in the locked configuration 132, respective radially-inner surfaces of the lock segments 126 contact and engage a radially-outer surface (e.g., annular surface) of the first annular member, thereby locking the connector 24 to the first annular member and blocking movement of the connector 24 relative to the first annular member.

With reference to FIGS. 7 and 8, the connector 24 includes a body 138 (e.g., annular body), which may have any of the features of the body 40 discussed above with respect to FIGS. 2-6. The plate 122 and the lock segments 126 are positioned within a recess 136 (e.g., annular recess) of the body 138. Furthermore, the plate 122 is configured to rotate in the circumferential direction 8, and the crank arm assembly 124 between the plate 122 and the lock segments 126 enables the rotation of the plate 122 to drive the lock segments 126 to move along the radial axis 6. As shown, each crank arm assembly 124 may include a crank arm 142, a first end portion 144 that is rotatably coupled (e.g., pivotally coupled) to the plate 122, and a second end portion 146 that is rotatably coupled (e.g., pivotally coupled) to a respective lock segment 126. The first end portion 144 may be rotatably coupled to a surface 148 (e.g., axially-facing surface; lower surface; lock segment-contacting surface) of the plate 122, and the second end portion 146 may be rotatably coupled to a surface 150 (e.g., axially-facing surface; upper surface; plate-contacting surface) of the lock segment 126.

The first end portion 144 is at a first position (e.g., circumferential position) along the circumferential axis 8 and the second end portion 146 is at a second position (e.g., circumferential position) along the circumferential axis 8. Furthermore, the first end portion 144 is at a first position (e.g., radially-outer position) along the radial axis 6 and the second end portion 146 is at a second position (e.g., radially-inner position) along the radial axis 6. The first end portion 144 may move along the circumferential axis 8 as the plate 122 rotates to adjust the connector 24 between the unlocked configuration 130 and the locked configuration 132. However, the second end portion 146 may not move along the circumferential axis 8 as the plate 122 rotates to adjust the connector 24 between the unlocked configuration 130 and the locked configuration 132. Instead, the second end portion 146 may move along the radial axis 6 (e.g., only along the radial axis 6, but not the circumferential axis 8) as the plate 122 rotates to adjust the connector 24 between the unlocked configuration 130 and the locked configuration 132. However, the first end portion 144 may not move along the radial axis 6 as the plate 122 rotates to adjust the connector 24 between the unlocked configuration 130 and the locked configuration 132. As shown, each of the crank arms 142 may have a curvature (e.g., curved cross-section).

Multiple lock segments 126 are labeled to illustrate that the multiple lock segments 126 may be positioned at discrete locations about the circumference of the connector 24. Multiple crank arm assemblies 124 may be spaced about the circumferential axis 8 of the connector 24, and each lock segment 126 may be coupled to and driven by a respective crank arm assembly 124. Furthermore, it should be appreciated that the connector 24 may include any suitable number of lock segments 126. As shown, a respective radially-inner surface 152 of each lock segment 126 may include engagement features 154 (e.g., radially-inwardly protruding elements) that are configured to contact and engage corresponding engagement features (e.g., radially-outwardly protruding elements) on the radially-outer surface of the first annular member to lock the connector 24 to the first annular member.

In the unlocked configuration 130, the lock segments 126 may be spaced apart from one another (e.g., adjacent lock segments 126 are separated by a circumferentially-extending gap 156). An interface 158 (e.g., radially-guiding interface; key-slot interface) between each lock segment 126 and the body 138 may block movement of the lock segment 126 in the circumferential direction 8, while enabling movement of the lock segment 126 along the radial axis 6. For example, at least a portion of each lock segment 126 may be supported or held within a respective radially-extending slot 160 formed in a surface 162 (e.g., axially-facing surface; lock segment-contacting surface) of the body 138. In particular, in the illustrated embodiment, each lock segment 126 includes a key 164 (e.g., protrusion) that extends from a surface 166 (e.g., axially-facing surface; body-contacting surface). The key 164 may contact and engage the respective radially-extending slot 160 to thereby block movement of the lock segment 126 in the circumferential direction 8, while enabling movement of the lock segment 126 along the radial axis 6. The interface 158 may guide the lock segments 126 to move along the radial axis 6 (and block the lock segments 126 from moving in the circumferential direction 8) as the plate 122 rotates in the circumferential direction 8. It should be appreciated that the slot of the interface 158 may be formed in the lock segment 126 and the key of the interface 158 may extend from the body 138. The interface 158 may work in conjunction with the crank arm assemblies 124 to drive the lock segments 32 along the radial axis 6 upon rotation of the plate 122.

Thus, as noted above, rotation of the plate 122 in the circumferential direction 8 may cause the first end portion 144 of the crank arm 142 to move in the circumferential direction 8. However, because the lock segments 32 are blocked from moving in the circumferential direction 8 by the interface 158, the lock segments 126 move radially along the radial axis 6 to adjust the connector 24 between the unlocked configuration 130 and the locked configuration 132. For example, in the illustrated embodiment, rotation of the plate 122 in a direction of arrow 170 would drive the lock segments 126 to move radially-inwardly to adjust the connector 24 from the unlocked configuration 130 to the locked configuration 132. Then, while the connector 24 is in locked configuration 132, rotation of the plate 122 in a direction of arrow 172 (e.g., opposite of the direction of arrow 170) would drive the lock segments 126 to move radially-outwardly to adjust the connector 24 from the locked configuration 132 to the unlocked configuration 130.

FIG. 9 illustrates an example of the positions of the lock segments 126, the crank arm assemblies 124, and the plate 122 while the connector 24 is in the unlocked configuration 130. For example, the lock segments 126 are separated by the gaps 156, and each crank arm assembly 124 is in a first orientation or position in which the crank arm 142 is at a first angle relative to the radial axis 6, in which the first end portion 144 of the crank arm 142 is at the first position along the circumferential axis 8, and in which the second end portion 146 of the crank arm 142 is at the first position along the radial axis 6. To move from the unlocked configuration 130 of FIG. 9 to the locked configuration 132 of FIG. 10, the plate 122 may be rotated in the direction of arrow 170.

FIG. 10 illustrates an example of the positions of the lock segments 126, the crank arm assemblies 124, and the plate 122 while the connector 24 is in the locked configuration 132. For example, the lock segments 126 are not separated by the gaps 156 (e.g., the adjacent lock segments 126 contact one another) and/or the gaps 156 between the lock segments 126 are smaller (e.g., as compared to the gaps 156 while the connector 24 is in the unlocked configuration 130). The lock segments 126 are also positioned further radially-inwardly and a diameter 174 the opening 138 is smaller (e.g., as compared to the unlocked configuration 130). Furthermore, each crank arm assembly 124 is in a second orientation or position in which the crank arm 142 is at a second angle relative to the radial axis 6, in which the first end portion 144 of the crank arm 142 is at the second position along the circumferential axis 8, and in which the second end portion 146 of the crank arm 142 is at the second position along the radial axis 6.

To move from the locked configuration 132 of FIG. 10 to the unlocked configuration 130 of FIG. 9, the plate 122 may be rotated in the direction of arrow 172 (e.g., opposite the direction of arrow 170). The plate 122 and/or the locking segments 126 may be fixed (e.g., may not move) along the axial axis 4 as the connector 24 transitions between the locked configuration 132 and the unlocked configuration 130. It should be appreciated that the plate 122 may be driven to rotate via any suitable drive system (e.g., the drive system 66 of FIG. 2). Together, the components within the recess 136 (e.g., the plate 122, the lock segments 126, the crank arm assemblies 124) may form the coupling assembly 120, and the coupling assembly 120 together with the drive system and other associated components may form a lock system (e.g., crank lock system). Additionally, it should be appreciated that any of the features disclosed above with respect to FIGS. 1-10 may be combined in any suitable manner.

The connector 24 disclosed herein may be used to join two components (e.g., annular components) to one another. It should be noted that the connector 24 may be positioned and/or operated via an automated procedure by an automated system (e.g., a remotely operated vehicle [ROV] system or an autonomously operated vehicle [AOV] system) and/or by an operator (e.g., via controlling the ROV system or the AUV system). For example, the ROV system or the AUV system may carry the connector 24, which is coupled to the BOP stack 20, to a position over the wellhead 16. The ROV system or the AUV system may align the opening of the connector 24 with the wellhead 16 and may lower the connecter relative to the wellhead 16 such that the lock segments of the connector 24 circumferentially surround the wellhead 16. Then, the drive system may be operated (e.g., via control by the ROV system or the AUV system, via control from an operator at the vessel or platform, and/or via a processor that performs an automated process) to drive the plate to rotate in a first direction, thereby driving the lock segments radially inwardly to the locked configuration to lock to the wellhead 16. To separate the connector 24 from the wellhead 16, the drive system may be operated to drive the plate to rotate in a second direction opposite the first direction, thereby driving the lock segments radially outwardly to the unlocked configuration to separate from the wellhead 16.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A connector configured to couple a first annular member to a second annular member, comprising:
   a rotatable plate;
   a plurality of lock segments;
   a coupling assembly configured to couple the rotatable plate to the plurality of lock segments, such that rotation of the rotatable plate in a circumferential direction drives the plurality of lock segments along a radial axis to adjust the connector between an unlocked configuration and a locked configuration;
   a body; and
   key-slot interface between the plurality of lock segments and the body, wherein the key-slot interface is configured to enable movement of the plurality of lock segments along the radial axis and to block movement of the plurality of lock segments in the circumferential direction, and
   wherein the plurality of lock segments are configured to be separated from one another by circumferentially-extending gaps while the connector is in the unlocked configuration, and the plurality of lock segments are configured to contact one another while the connector is in the locked configuration.

2. The connector of claim 1, wherein the coupling assembly comprises a plurality of grooves and a plurality of protrusions configured to engage the plurality of grooves and to follow the plurality of grooves during rotation of the rotatable plate.

3. The connector of claim 2, wherein the plurality of grooves are formed in a respective axially-facing surface of the rotatable plate, and the plurality of protrusions extend from a respective axially-facing surface of the plurality of lock segments.

4. The connector of claim 2, wherein a first protrusion of the plurality of protrusions extends from a first lock segment of the plurality of lock segments, and a second protrusion of the plurality of protrusions extends from a second lock segment of the plurality of lock segments.

5. The connector of claim 4, wherein the first protrusion is configured to engage and to follow a first groove of the plurality of grooves, and the second protrusion is configured to engage and the follow a second groove of the plurality of grooves.

6. The connector of claim 2, wherein each protrusion of the plurality of protrusions is positioned proximate to a respective first end portion of a respective groove of the plurality of grooves while the connector is in the unlocked configuration and is positioned proximate to a respective second end portion of the respective groove of the plurality of grooves while the connector is in the locked configuration.

7. The connector of claim 6, wherein the respective first end portion of the respective groove is positioned at a first radial position and the respective second end portion of the respective groove is positioned at a second radial position that is radially-inward of the first radial position.

8. The connector of claim 2, wherein each groove of the plurality of grooves comprises a curved cross-sectional shape.

9. The connector of claim 1, wherein the first annular member comprises one of a riser, a blowout preventer stack, or a wellhead.

10. The connector of claim 1, wherein the coupling assembly comprises a plurality of crank arms, wherein each crank arm of the plurality of crank arms comprises a respective first end portion pivotally coupled to the rotatable plate and a respective second end portion pivotally coupled to one lock segment of the plurality of lock segments.

11. A system, comprising:
a connector configured to couple a first annular member to a second annular member, wherein the connector comprises:
a rotatable plate;
a plurality of lock segments;
a cam lock assembly comprising a plurality of grooves and a plurality of protrusions configured to engage and to follow the plurality of grooves during rotation of the rotatable plate in a circumferential direction, thereby enabling the rotation of the rotatable plate in the circumferential direction to drive the plurality of lock segments along a radial axis to adjust the connector between an unlocked configuration and a locked configuration;
a body; and
a key-slot interface between the plurality of lock segments and the body, and the key-slot interface is configured to enable movement of the plurality of lock segments along the radial axis and to block movement of the plurality of lock segments in the circumferential direction,
wherein the plurality of grooves are formed in the rotatable plate, and the plurality of protrusions extend from the plurality of lock segments.

12. The system of claim 11, wherein each protrusion of the plurality of protrusions is positioned proximate to a respective first end portion of a respective groove of the plurality of grooves while the connector is in the unlocked configuration and is positioned proximate to a respective second end portion of the respective groove of the plurality of grooves while the connector is in the locked configuration.

13. The system of claim 11, wherein a first protrusion of the plurality of protrusions extends from a first lock segment of the plurality of lock segments, a second protrusion of the plurality of protrusions extends from a second lock segment of the plurality of lock segments, the first protrusion is configured to engage and to follow a first groove of the plurality of grooves, and the second protrusion is configured to engage and to follow a second groove of the plurality of grooves.

14. The system of claim 11, comprising a drive system configured to drive the rotation of the rotatable plate.

15. The system of claim 11, comprising the first annular member, wherein the first annular member comprises a riser, a blowout preventer stack, or a wellhead.

16. A method of coupling a connector to a first annular member of a drilling and/or production system, the connector comprising: a body; a plurality of lock segments; and a key-slot interface between the plurality of lock segments and the body, the method comprising:
operating a drive system to rotate a rotatable plate in a circumferential direction to thereby drive the plurality of lock segments along a radial axis via a coupling assembly of the connector that couples the rotatable plate to the plurality of lock segments; and
adjusting the connector between an unlocked configuration and a locked configuration,
wherein the key-slot interface is configured to enable movement of the plurality of lock segments along the radial axis and to block movement of the plurality of lock segments in the circumferential direction, and
wherein the plurality of lock segments are configured to be separated from one another by circumferentially-extending gaps while the connector is in the unlocked configuration, and the plurality of lock segments are configured to contact one another while the connector is in the locked configuration.

* * * * *